Sept. 28, 1965  A. F. MANZ  3,209,121

ELECTRODE PROXIMITY CONTROL

Filed Sept. 4, 1962

INVENTOR.
AUGUST F. MANZ
BY
Barnwell P. King
ATTORNEY

3,209,121
ELECTRODE PROXIMITY CONTROL
August F. Manz, Newark, N.J., assignor to Union Carbide Corporation, a corporation of New York
Filed Sept. 4, 1962, Ser. No. 221,083
7 Claims. (Cl. 219—130)

This invention relates to electrodes proximity control, and more particularly to automatic control of the position of the melting end of a consumable electrode that is being fed at a constant preselected speed in accordance with the consumption of such electrode.

The invention provides a process which comprises feeding at a constant speed, a metal-wire electrode through a contact tube toward metal-work in circuit with an electric power source, heating and melting the end of such electrode as molten electrode metal is thereby deposited on the work, producing an electrical signal originating at the very end of such electrode that is responsive to the relative position of said electrode end with respect to the corresponding end of the contact tube and controlling the relative position of such contact tube end with respect to the work with said signal without altering the constant speed at which the electrode is so fed toward the work.

The invention also provides a system for automatically controlling the relative position of the end of an electrode with respect to work-in-circuit therewith as such electrode is fed at a constant speed toward such work, which comprises a torch, having a nozzle means for feeding such electrode toward such work at a constant preselected speed through said torch, means for heating to melt the end of such electrode as it is so-fed by said feed means thereby producing a signal originating from the very end of such electrode, means for adjusting the relative position of the end of said torch with respect to the work without altering said constant preselected electrode feed speed, signal detector means responsive to the precise position of the end of such electrode with respect to such torch end as the electrode emerges from the nozzle, and means responsive to said signal detector means for controlling said adjusting means to maintain said torch at a substantially constant relative position with respect to the work.

In the art of "mig" welding, for example, there is a need for automatically controlling the height of the torch as the weld bead is made, which does *not* depend on the arc voltage, since the latter, particularly in constant potential power source-arc systems does not provide an adequate control signal for such purpose. It has also been proposed to use a system employing a mechanical follower, such as a roller on the workpiece, to determine the torch height above the weld and to reposition the torch by mechanical means referenced to such mechanical follower. Such prior system, however, includes the following disadvantages:

(1) Due to the intense heat in the vicinity of the torch it is practically impossible to use such a follower in the immediate vicinity of the torch.

(2) The follower means interferes with the shielding gas and weld bead patterns if great caution is not exercised as to its placement.

(3) Due to irregularities of workpiece contours such a mechanical follower is not able to "sense" the correct torch height because of item 1 above.

The main object of this invention is to provide a method of and means for automatically controlling the position of the melting end of a consumable electrode without altering the feed rate of such electrode, which is simple yet effective and very efficient.

Another object is to provide a system for automatically controlling the torch height in sigma welding, while maintaining the electrode feed speed substantially constant, which system depends on radiation emitted by the end of the consumable electrode.

New and unexpected advantages of the invention include:

(1) Anticipation of a change in contour, because the sigma arc envelope "sees" the contour change before the electrode end is positioned above the point of contour change, such arc envelope is changed by the change in contour and indirectly causes the position of the electrode end to be changed by the well known self regulation characteristic of sigma welding systems, thereby creating a signal which causes the electrode end positioning means to operate before the electrode end is at the point of contour change.

(2) Noncritical adjustment of the signal pickup, i.e., it was found that the photo sensitive pickup would create a control signal without a lens system or a 10:1 change in aperture.

(3) Greater degree of sensitivity and greater speed of response than anticipated due to 1 above.

Figure 1:
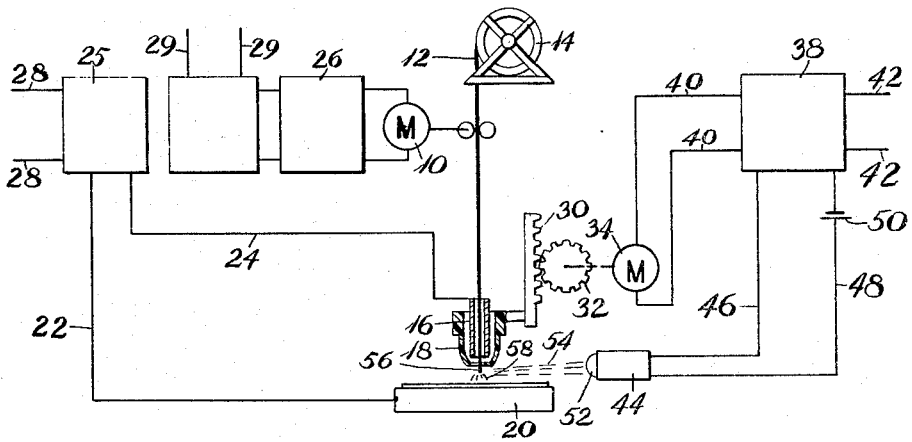
FIG. 1 is a simplified circuit diagram illustrating the invention in sigma melting.

As shown in FIG. 1, the sigma welding set-up per se includes an electrode-wire feed motor 10 which draws the electrode-wire 12 from a reel 14 and feeds such electrode-wire through a contact-guide tube 16 in a torch 18. Work 20 in circuit with such electrode-wire 12 is disposed below said torch 18, welding current being conducted to the contact-guide tube 16 and work 20 by leads 22 and 24 from a welding current source 25 which is connected to a suitable electrode power source by lines 28, 28. The electrode wire 12 is fed by said motor 10 at a preselected speed by means of a control 26 which is connected to a suitable electrical power source by lines 29, 29.

The torch 18 is connected to a rack 30 for vertical movement with respect to the work 20. Such rack is operated by a gear 32 which is driven by a motor 34. Such motor is electrically connected to a control 38, such as a relay, by leads 40, 40. The control 38 is, in turn, connected to a source of electrical power by lines 42, 42; and to a photocell 44 by leads 46 and 48, the latter including a battery 50. The photo-cell lens 52 is directed to pick up radiation 54 from the very end 56 of electrode-wire 12 as the latter is melted by the arc 58 energized between such electrode 56 end and the work 20.

Figure 2:
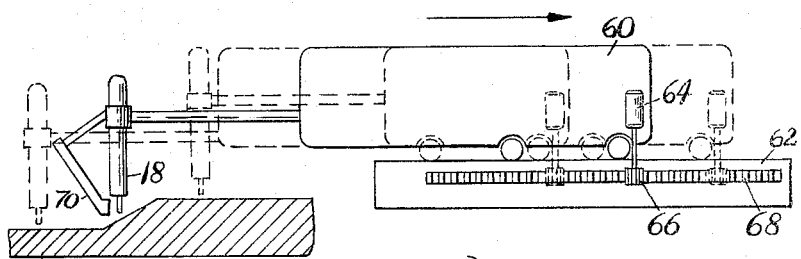
FIG. 2 is a view mainly in side elevation of the apparatus.

The torch head, rack and pinion, and drive motors are mounted on a carriage 60, FIG. 2, that is mounted on a beam 62 and driven above and parallel to the work by a motor 64 which drives a pinion 66 meshing with a rack 68 on the beam 62.

Figure 3:
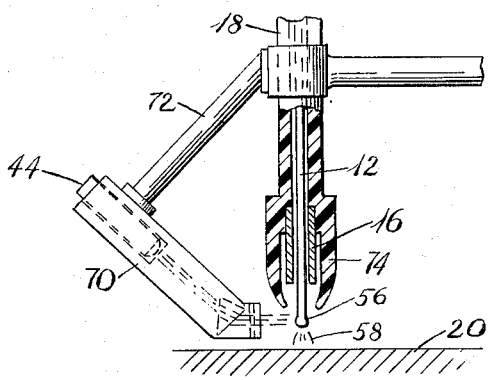
FIG. 3 is an enlarged view in side elevation of the torch-photo-cell assembly.

As shown in FIG. 3, a photo-cell casing 70 is attached to the torch by a suitable clamp bracket 72, so that radiation from the extreme end of the electrode emerging from the torch cup 74 is effectively transmitted to the light sensitive element.

The photocell casing 70 must be attached to the torch 18, as shown in FIG. 3, in order for the system to be operative; because the photocell 44 in the present invention detects any difference in the position of the end 56 of the electrode wire 12 with respect to the torch 18. Thus, in case the torch-to-work distance tends to increase, for example, the location of the end of the electrode with respect to such torch will tend to be greater, thereby decreasing the radiation signal detected by the photocell from the electrode end. This results in a decreasing torch-to-work distance by virtue of the operation of the proximity control, thereby restoring the distance to its preselected value. This constitutes a vital feature of the invention.

In operation, any tendency for the length of arc 58 to change, results in a change in the position of the electrode-end. This changes the position of the radiation source, operating the photo-cell 44 to produce an electrical signal which operates the control 38 to energize the motor 34 to turn the gear 32 to adjust the rack 30 to change the position of the torch 18 to bring the end of the electrode back to the desired position with respect to the work. The electrode-wire feed speed, however, is not affected by such automatic electrode-end position control.

An actual reduction to practice of the invention included an OM 48 (Linde) side beam carriage and track on which was mounted an SEH (Linde) sigma welding head and an HW 13 (Linde) torch. Such head was hooked up to an SCC 6 (Linde) welding control. An HWM 2 (Linde) control was electrically connected to the pinion drive motor which was a D.C. shunt motor. The photo-cell assembly included an RPT 3R3 Receiver, an RPT 3R4 Lens Barrel an RPT 3A90 Prism attachment, made by Photobell Co., Inc., New York City, mounted at angle of 45° to the torch, with a right-angled prism disposed between the electrode end and such photo-cell. The photo-cell was powered by a 7½ volt (Eveready) battery.

With ⁹⁄₆₄ inch diameter aluminum wire, an arc welding current of 270–300 amperes, at an arc voltage of 27–28, with argon shielding gas flowing at the rate of 40 cu. ft./hr., through a No. 10 (Linde) cup, and a substantially constant wire feed speed, the reference voltage of the HWM 2 control was set at 2½ volts. As a result when the voltage derived from the photo-cell matched such voltage the pinion drive motor was de-energized and the torch remained stationary.

However, for example, when the torch tended to get closer to the work, the electrode extension bcame shorter due to the inherent self-regulation of the sigma welding system, producing a greater photo-cell signal voltage output due to the increase in radiation by virtue of the proximity of the arc at the end of the electrode, causing the control to energize the motor, raising the torch until the voltage signal output of the photo-cell again matched that of the control.

Thus, as the carriage traversed the work being welded, the torch was automatically adjusted to maintain a predetermined spacing with the work, regardless of the changes in the relative position of parts of such work with the path followed by the carriage. A 0.010″ change in such spacing brought about the desired correction. Further more, an incline at the rate of 20″/min. traverse was also possible.

What is claimed is:

1. Process which comprises feeding at a constant speed a metal wire electrode through a contact tube toward metal-work in an arc welding circuit with an electric power source, heating and melting the end of such electrode adjacent the arc as molten electrode metal is deposited on the work, producing an electrical signal originating from the very end of such electrode that is responsive to the relative position of said heated and melted electrode end with respect to that of the contact tube, and maintaining such position substantially constant by controlling such position responsive to said signal without altering the constant speed at which the electrode is so fed toward the work, by observing such electrode end as it emerges from such contact tube during the operation of the arc.

2. Process which comprises feeding a metal-wire electrode at a constant speed first through a contact tube then through a gas cup toward metal-work in circuit with an electric power source, heating the end of such electrode and transferring molten metal from such electrode end to such work, thereby producing at such electrode end a sharply defined point of radiation, using such radiation from said point to detect the precise position of such electrode end with reference to the corresponding end of such contact tube, converting such detection to a signal and maintaining such position substantially constant by using such signal to control the relative position of said gas cup end with respect to such work without changing the rate at which the electrode is so-fed toward the work, by observing such point of radiation while molten metal is being deposited on the work.

3. Process as defined by claim 1, in which the adjacent work and electrode end are shielded with a stream of selected gas and a self-regulating arc of relatively constant length is maintained between such electrode and work by the process.

4. A system for automatically controlling the relative position of the end of an electrode with respect to work-in-circuit therewith, comprising feed means for advancing such electrode through a contact-guide tube toward the work at a constant preselected speed, means including such tube for heating to melt the end of such electrode as the latter is advanced by said feed means through such tube, means for adjusting the relative position of such tube end with respect to the work without altering said constant preselected electrode-feed speed, and means responsive to the precise position of the very end of such electrode for controlling said adjusting means to maintain said tube end at a substantially constant relative position with respect to the work.

5. A system as defined by claim 4, which includes means for traversing such tube and electrode with respect to the work at substantially right angles to the direction of feed of the electrode toward the work.

6. In a self-regulating arc welding proximity control, the combination with a carriage adapted to move along a predetermined path with respect to work being welded, a sigma torch comprising a gas cup mounted on said carriage, means for feeding an electrode-wire through said torch toward such work at a preselected constant speed, and means for energizing a self-regulating welding arc between the end of such wire and the work as the wire is so-fed creating a sharply defined radiant point at the end of such wire, means on said carriage supporting said torch including such cup for adjustment toward and away from such work, a motor connected to said torch adjustment means, and a control circuit for said motor including a radiation detector mounted on said carriage for viewing the radiant point at the end of such electrode-wire as soon as it emerges from the gas cup of said torch, for automatically controlling the spacing of said torch from such work as said carriage follows such path during the welding operation without changing the selected constant wire feed rate.

7. Process for controlling torch to work proximity which comprises feeding at a constant speed a metal wire electrode through a contact tube toward metal-work in circuit with an electric power source, energizing a sharply defined point of light at the extreme end of such electrode as molten electrode metal is deposited on the work, producing an electrical signal that is responsive to the relative position of such sharply defined point of light at said electrode end with respect to that of the contact tube, and maintaining such position substantially constant by controlling such position with said signal without altering the constant speed at which the electrode is so fed toward the work.

References Cited by the Examiner
UNITED STATES PATENTS

| | | | |
|---|---|---|---|
| 2,031,288 | 2/36 | Tripp | 219—135 |
| 2,897,341 | 7/59 | MacKusick | 219—130 |

RICHARD M. WOOD, *Primary Examiner.*